INVENTOR
Edmund BEIGL
Siegfried GUTSCHKE

United States Patent Office 3,536,974
Patented Oct. 27, 1970

3,536,974
MOTOR CONTROL ARRANGEMENT
Edmund Beigl, Buhl, and Siegfried Gutschke, Ettlingen, Germany, assignors to Robert Bosch GmbH, Stuttgart, Germany
Filed Feb. 29, 1968, Ser. No. 709,490
Claims priority, application Germany, Mar. 1, 1967, B 91,418
Int. Cl. H02p 7/08
U.S. Cl. 318—361          9 Claims

ABSTRACT OF THE DISCLOSURE

A control circuit for controlling the operation of a D.C. motor. The D.C. motor is equipped with three brushes two of which lie diametrically opposite to each other. The third brush is angularly displaced by a predetermined amount from one of these two brushes. A two-pole, double throw switch is connected to the brushes of the motor and the power supply for energizing the latter and maintaining it in operation. The switch arrangement is such that when located in one position the motor rotates in one direction. When the switch is actuated to its second position the motor drives in the opposite direction. Through means of the third brush, the locked rotor torque of the motor is smaller in one direction of motion than in the other direction of motion. A resistor connected in series with the third brush reduces the voltage applied to the motor and thereby serves to further widen the differences in the operating characteristics of the motor in its two directions of rotation. Permanent magnetic means is used to excite the motor.

BACKGROUND OF THE INVENTION

Arrangements are known in the art in which the driving motor becomes stationary or is switched over when experiencing resistance while in the process of closing windows, doors or sliding roofs, as a result of an increase in the current. Such arrangements require relatively large numbers of electrical components for controlling the operation of the driving motor. A corresponding increase in the complexity of the circuit arrangement is obtained.

Arrangements are also known in the art which use slip couplings in the motor driving linkage. The slip coupling serves to limit the force or torque applied by the motor to the part being moved or driven. These arrangements require particular care during assembly because the slip coupling must be specially adjusted. In addition, such designs have the disadvantage that the slip coupling also limits the applied force to the moving part when operating in the direction to open the window or door.

Accordingly, it is an object of the present invention to provide an arrangement which improves upon the conventional ones mentioned above, through relatively simple means. It is an object of the present invention to avoid any injury to any member or body caught between the frame and the movable door or window when the latter is being driven in the close direction.

To achieve the objects of the present invention, an electrical component is inserted within the power circuit of the driving motor. This component is designed and selected so that the motor has a larger locked rotor torque in the open direction than it has in the closing direction.

The arrangement, in accordance with the present invention, has the advantage that the maximum value of the force applied by the motor may be limited when closing the window or door. As a result, any possible danger of injury is prevented. When the motor is operating so as to move the window or door in the open direction, on the other hand, the applied force may have considerably greater magnitude. A larger force under opening conditions is desirable because it will serve to break free the window or door when the latter is tightly held in position.

It is of special advantage, in accordance with the present invention, when the electrical component is designed so that when driving in the open direction, the driving motor exhibits a speed-torque characteristic having a smaller slope than when driving in the closing direction.

The preceding arrangement results in an intersection of the two speed-torque characteristics of the motor. In this manner, the motor may drive in both directions with a minimum speed for closing and opening the window or the like.

These requirements for different locked rotor torques and different slopes in the speed-torque characteristics in both directions of the driving motor, may be readily obtained through the use of D.C. motors. The electrical component inserted into the motor circuit for this purpose is in the form of a third brush. The latter becomes connected into the circuit when the motor operates in the closing direction.

By selecting the electrical and magnetic parameters of the motor in conjunction with the preceding arrangement, the aforementioned requirements may be met with a single additional component in the form of a third brush. It is of particular advantage when the excitation for the D.C. motor is accomplished through permanent magnetic means.

In many cases it is also of special advantage when, in accordance with the present invention, a resistor is connected in series with the third brush. Such a resistor serves to reduce the voltage applied to the motor when operating in the closing direction. This arrangement also permits a particularly large difference between the locked rotor torques of the motor in the two rotating directions. When using the third brush and a resistor of the proper magnitude, it is possible to achieve that the motor, when driving unobstructed, will operate in both directions with the same speed even though a large difference between the locked rotor torques prevails.

SUMMARY OF THE INVENTION

A circuit arrangement for controlling the operation of a D.C. motor. The motor preferably excited from permanent magnetic means, has three brushes. Two of these brushes are located diametrically opposite each other, whereas the third brush is displaced from one of these two brushes by a predetermined angular amount. The three brushes of the motor are connected to a reversing type of switching having two movable contacts each operating in conjunction with two fixed contacts. The two movable contacts are permanently connected to the power supply for the motor. When the reversing switch is actuated so that it is positioned in one of its two possible states, the motor drives in one direction. When the switch is actuated to its opposite state, the motor is correspondingly driven in the opposite direction. The provision of the third brush in the motor circuit imposes the condition that the locked rotor torque of the motor is larger when the motor rotates in one direction than when the motor rotates in the other and opposite direction. This feature of the motor can be further broadened through the insertion of a resistor in series with the third brush. The control circuit for the motor is particularly adapted for opening and closing windows and doors where smaller locked rotor torques are desired during the closing phase than during the opening phase.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
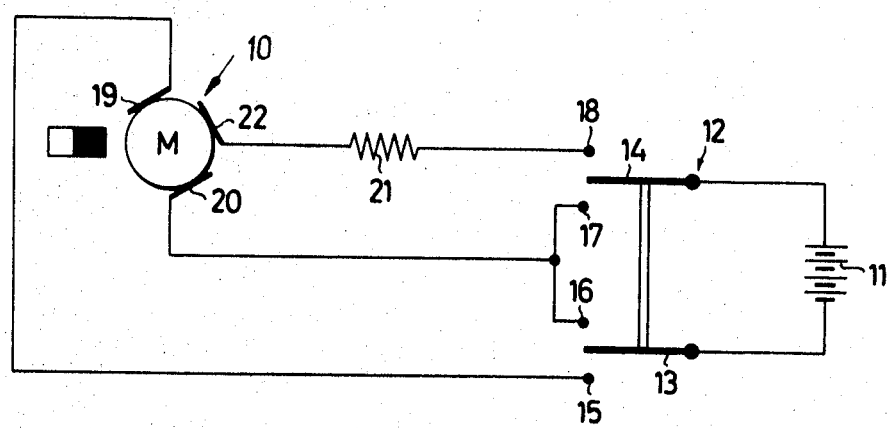
FIG. 1 is an electrical schematic diagram of the arrangement for opening and closing windows in motor vehicles, in accordance with the present invention.

Referring to the drawing, the arrangement in accordance with the present invention includes a D.C. motor 10 excited through permanent magnetic means. The motor moves the window of a motor vehicle through a mechanical linkage not shown. A battery 11 provides the power to operate the motor which may be selectively driven in either one of its two directions through the reversing switch 12. The switch 12 is also designed to disconnect the motor from the motor vehicle battery 11 in either one of its directions of operation. When rotating in one direction, the motor operates to open the window. When rotating in the opposite direction, on the other hand, the motor causes the window to close.

The switch 12 has two movable contacts 13 and 14 connected to the battery 11 of the motor vehicle, so that one contact is connected to one polarity terminal of the battery, whereas the other contact of switch 12 is connected to the opposite polarity terminal of the battery. The movable contact 13 operates in conjunction with two fixed contacts 15 and 16. The movable contact 14, on the other hand, is similarly associated with two fixed contacts 17 and 18. The fixed contact 15 is connected to a brush 19 of the motor 10. This brush 19 lies within the neutral zone of the motor. A second brush 20 is located diametrically across from the brush 19. The brush 20 is electrically connected to the two fixed contacts 16 and 17. The fixed contact 18 is connected to a third brush 22, by way of a resistor 21. The brush 22 is displaced from the brush 19 by a predetermined angle.

Figure 2:
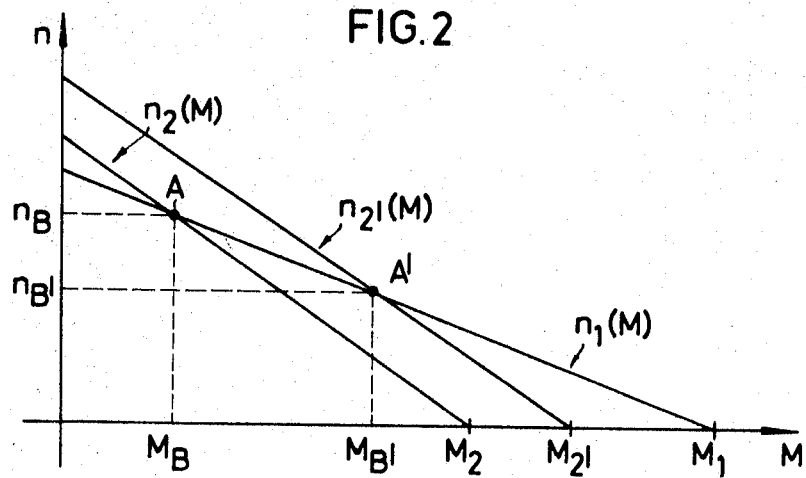
FIG. 2 is a graphical plot of the speed-torque characteristics of the driving motor used in the arrangement of FIG. 1.

The movable contacts 13 and 14 are both in their circuit disconnected for circuit-off position, when in the locations shown in the drawing. Through an actuating arrangement, not shown, the switching contacts 13 and 14 may be moved manually in either one of their two operative positions. In the first operative position the movable contact 13 rests against the fixed contact 15, and the movable contact 14 is against the contact 17. In this circuit condition, the two brushes 19 and 20 lying diametrically opposite to each other, are connected to the motor vehicle battery 11. As a result, the motor rotates in the direction which tends to open the window of the motor vehicle. When thus operating to open the window, the motor has the operating characteristic denoted by the curve $n_1(M)$, shown in FIG. 2. This curve represents the speed torque characteristics of the motor. The speed is denoted by $n$, whereas the torque is denoted by M. The locked rotor torque of the motor is denoted by $M_1$. This locked rotor torque is sufficient to move the window even when it is frozen in place in its closed position.

In the second circuit state, the movable bridge contact 13 rests against the fixed contact 16, while the movable contact 14 lies against the contact 18. In this state of the circuit current flows from the battery to the third brush 22, by way of the movable contact 14 and the resistor 21. Current flow prevails between the brushes 22 and 20 through a portion of the armature winding. The current is returned to the battery 11 by flowing from the brush 20 to the fixed contact 16 and through the movable contact 13. As a result of this current flow, the motor rotates in the manner which tends to close the window. When operating in this manner, the motor has the operating characteristic denoted by the curve $n_2(M)$ shown in FIG. 2. This characteristic has the locked rotor torque $M_2$. The locked rotor torque $M_2$ is considerably smaller than the locked rotor torque $M_1$. In this manner there is substantially no danger of incurring injury when the window closes.

The change in the operating characteristics of the motor from that of $n_1(M)$ to $n_2(M)$ is accomplished by switching the brush 22 and the resistor 21 into the circuit of the motor 10. When switching into the circuit only the brush 22, the speed-torque characteristics of the motor is transferred from the curve $n_1(M)$ to the curve $n_{2'}(M)$. The locked rotor torque thereby drops from the value $M_1$ to the value $M_{2'}$. The curve $n_{2'}(M)$ has a larger slope than the curve or characteristic line $n_1(M)$. Accordingly, the two lines intersect at a point A'. At this point of intersection the motor exhibits the same torque $M_{B'}$ for equal speeds in both directions of operation.

When applying the resistor 21, the terminal voltage of the motor is reduced, and the speed-torque characteristics $n_{2'}(M)$ of the motor is shifted to the left. In this manner the line $n_2(M)$ is attained. As a result, the locked rotor torque of the motor is reduced to the desired value $M_2$ when the motor rotates in the direction which closes the window. At the same time, this shift in the operating characteristics of the motor also causes the intersection point to be moved to the left. The operating characteristics $n_1(M)$ and $n_2(M)$ intersect at the point A, at which the torque of the motor is $M_B$ and the speed of the motor is $n_B$. The operating values at this point of intersection A are required in order to open and close the windows with a predetermined speed.

Through proper design of the motor with respect to its electrical and magnetic parameters, the point of intersection A' determined by the two operating characteristics $n_1(M)$ and $n_{2'}(M)$, may be maintained within desired and predetermined limits. As a result of the arrangement, in accordance with the present invention, the motor will drive the window in both directions at the same speed, when no obstructions prevail, by connecting only a third brush into the circuit. This applies to the majority of cases. When obstructions do occur, locked rotor torques may be applied with different values in both directions. By arranging an auxiliary resistor in the circuit, it is possible to vary still further the intersection point within selected limiteds. Thus, by using such an auxiliary resistor it is possible to vary the point of intersection over wider limits than is possible through the use of only a third brush.

In accordance with the present invention, it is also possible to design the motor circuit so that it exhibits different torques for the same speed in both directions. This is of advantage when it is necessary to take into account the weight of the part being moved, as, for example, a large window pane. In certain cases it may also be desirable that the motor move the part in both directions with different speeds. In each of these cases, the desired speed-torque characteristics of the motor may be achieved through proper scaling and design of the electrical components within the circuit of the driving motor.

It will be understood that each of the elements described above, or two or more together, may also find a useful application in other types of control arrangement for windows and doors differing from the types described above.

While the invention has been illustrated and described as embodied in a control arrangement for windows and doors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the append claims.

1. A motor control arrangement for controlling the speed-torque characterisics of a motor in both directions of operation comprising, in combination, an electrical driving motor rotatable in both directions of motion; an electrical source of energy; interconnecting means for connecting said source of energy to said motor; reversing switching means in said interconnecting means and establishing the direction of rotation of said motor when actuated, said motor rotating in one direction when said switching means is in a first operative state and said motor rotating in the opposite direction when said switching means is in a second operative state; electrical component means connected to said interconnecting means and said switching means so that said motor has a larger locked rotor torque when rotating in said one direction than when rotating in said other opposite direction, said motor comprising a direct-current motor; two motor brushes located diametrically opposite each other and connected to said interconnecting means, said electrical component means being a third motor brush connected to said interconnecting means by said switching means for reducing the locked rotor torque of said motor when rotating in one of said two directions of motion; and resistor means connected in series with said third motor brush and connected to said interconnecting means by said switching means for reducing the voltage applied to said motor when rotating in the direction in which the locked rotor torque is reduced through said third motor brush means.

2. The motor control arrangement for controlling the speed-torque characteristics of a motor as defined in claim 9, wherein the slope of the speed-torque characteristics of the motor when driving in one direction is smaller than the speed-torque characteristics of the motor when driving in the other opposite direction.

3. The motor control arrangement for controlling the speed-torque characteristics of a motor as defined in claim 9, wherein said motor comprises a direct-current motor.

4. The motor control arrangement for controlling the speed-torque characteristics of a motor as defined in claim 1, wherein said third motor brush and said resistor means are arranged so that the motor speed in both directions of rotation is substantially the same for a predetermined torque prevailing during unobstructed operating conditions.

5. The motor control arrangement for controlling the speed-torque characteristics of a motor as defined in claim 9, wherein said switching means comprises two movable switching contacts each associated with two fixed contacts, said movable switching contacts being connected to said electrical source of energy.

6. The motor control arrangement for controlling the speed-torque characteristics of a motor as defined in claim 5, including mechanical connecting means connecting mechanically together said two movable switching contacts whereby said movable switching contacts are moved in unison through their range of motion.

7. The motor control arrangement for controlling the speed-torque characteristics of a motor as defined in claim 9, wherein said electrical source of energy comprises a D.C. battery.

8. The motor control arrangement for controlling the speed-torque characteristics of a motor as defined in claim 9, including permanent magnetic means for exciting said motor.

9. A motor control arrangement for controlling the speed-torque characteristics of a motor in both directions of operation comprising, in combination, an electrical driving motor rotatable in both directions of motion; an electrical source of energy; interconnecting means for connecting said source of energy to said motor; reversing switching means in said interconnecting means and establishing the direction of rotation of said motor when actuated, said motor rotating in one direction when said switching means is in a first operative state and said motor rotating in the opposite direction when said switching means is in a second operative state; electrical component means connected to said interconnecting means and said switching means so that said motor has a larger locked rotor torque when rotating in said one direction than when rotating in said other opposite direction; and two motor brushes located diametrically opposite each other and connected to said interconnecting means, said electrical component means being a third motor brush connected to said interconnecting means by said switching means for reducing the locked rotor torque of said motor when rotating in one of said two directions of motion.

References Cited
UNITED STATES PATENTS

| | | | |
|---|---|---|---|
| 3,310,722 | 3/1967 | Diello | 318—345 X |
| 3,411,064 | 11/1968 | Mellor | 318—541 X |

ORIS L. RADER, Primary Examiner

T. LANGER, Assistant Examiner

U.S. Cl. X.R.

318—293, 349, 541